United States Patent
Bonwick

(10) Patent No.: US 9,378,149 B1
(45) Date of Patent: Jun. 28, 2016

(54) METHOD AND SYSTEM FOR TRACKING MODIFICATION TIMES OF DATA IN A STORAGE SYSTEM

(71) Applicant: Jeffrey S. Bonwick, Los Altos, CA (US)

(72) Inventor: Jeffrey S. Bonwick, Los Altos, CA (US)

(73) Assignee: EMC Corporation, Hopkinton, MA (US)

( * ) Notice: Subject to any disclaimer, the term of this patent is extended or adjusted under 35 U.S.C. 154(b) by 0 days.

(21) Appl. No.: 14/473,243

(22) Filed: Aug. 29, 2014

(51) Int. Cl.
*G06F 12/02* (2006.01)
*G06F 12/10* (2016.01)

(52) U.S. Cl.
CPC ........ *G06F 12/1009* (2013.01); *G06F 12/0246* (2013.01); *G06F 2212/65* (2013.01); *G06F 2212/7201* (2013.01)

(58) Field of Classification Search
CPC ............ G06F 12/1009; G06F 12/0246; G06F 2212/7201; G06F 2212/65
See application file for complete search history.

(56) References Cited

U.S. PATENT DOCUMENTS

| | | | |
|---|---|---|---|
| 5,873,097 A * | 2/1999 | Harris ............... | G06F 17/30348 707/704 |
| 6,850,969 B2 | 2/2005 | Ladan-Mozes et al. | |
| 6,996,682 B1 | 2/2006 | Milligan et al. | |
| 7,366,825 B2 | 4/2008 | Williams et al. | |
| 7,543,100 B2 | 6/2009 | Singhal et al. | |
| 7,610,438 B2 | 10/2009 | Lee et al. | |
| 7,634,627 B1 | 12/2009 | Ohr et al. | |
| 7,650,458 B2 | 1/2010 | Rogers et al. | |
| 7,685,126 B2 | 3/2010 | Patel et al. | |
| 7,694,091 B2 | 4/2010 | Andrewartha et al. | |
| 7,702,849 B2 | 4/2010 | Saarinen et al. | |
| 7,739,312 B2 | 6/2010 | Gordon et al. | |
| 7,773,420 B2 | 8/2010 | Kim | |
| 7,836,018 B2 | 11/2010 | Oliveira et al. | |
| 7,870,327 B1 | 1/2011 | Cornwell et al. | |
| 7,904,640 B2 | 3/2011 | Yano et al. | |
| 7,913,032 B1 | 3/2011 | Cornwell et al. | |
| 7,917,803 B2 | 3/2011 | Stefanus et al. | |
| 7,978,516 B2 | 7/2011 | Olbrich et al. | |
| 8,074,011 B2 | 12/2011 | Flynn et al. | |
| 8,301,832 B1 * | 10/2012 | Moore .................... | G06F 3/061 711/103 |
| 8,370,567 B1 * | 2/2013 | Bonwick ............... | G06F 3/0688 711/103 |
| 8,407,377 B1 * | 3/2013 | Shapiro ............. | G06F 15/17331 709/203 |
| 8,601,206 B1 * | 12/2013 | Shapiro ................. | G06F 3/0623 711/105 |
| 2005/0055531 A1 | 3/2005 | Asami et al. | |
| 2007/0073989 A1 | 3/2007 | Sharma et al. | |
| 2007/0168633 A1 | 7/2007 | English et al. | |
| 2008/0229003 A1 | 9/2008 | Mizushima et al. | |

(Continued)

OTHER PUBLICATIONS

Internation Search Report and Written Opinion in PCT/US2013/033276, mailed Jul. 24, 2013 (8 pages).

*Primary Examiner* — Hiep Nguyen
(74) *Attorney, Agent, or Firm* — Osha Liang LLP

(57) ABSTRACT

A method for rebuilding an in-memory data structure. The method includes selecting a table of contents (TOC) entry of a TOC page in persistent storage, where the TOC entry includes an object identifier (ID) of an object, an offset ID, and a birth time. The method further includes determining, based on the object ID, that the in-memory data structure includes object metadata for the object including a mod time and an object map pointer to an object map tree. The method further includes that the birth time in the TOC entry is greater than the mod time, updating a stored physical address in the object map tree based on the offset ID to a physical address derived from the TOC entry; and updating the mod time stored in the object metadata to the birth time.

20 Claims, 13 Drawing Sheets

(56) References Cited

U.S. PATENT DOCUMENTS

| | | |
|---|---|---|
| 2009/0019245 A1 | 1/2009 | Bondurant et al. |
| 2009/0150641 A1 | 6/2009 | Flynn et al. |
| 2009/0198902 A1 | 8/2009 | Khmelnitsky et al. |
| 2009/0198947 A1 | 8/2009 | Khmelnitsky et al. |
| 2009/0198952 A1 | 8/2009 | Khmelnitsky et al. |
| 2010/0030827 A1 | 2/2010 | Sarakas |
| 2010/0030999 A1 | 2/2010 | Hinz |
| 2010/0042790 A1 | 2/2010 | Mondal et al. |
| 2010/0070735 A1 | 3/2010 | Chen et al. |
| 2010/0106895 A1 | 4/2010 | Condit et al. |
| 2010/0228800 A1 | 9/2010 | Aston et al. |
| 2010/0281230 A1 | 11/2010 | Rabii et al. |
| 2011/0022780 A1 | 1/2011 | Wakrat et al. |
| 2011/0231624 A1 | 9/2011 | Fukutomi et al. |
| 2011/0238886 A1 | 9/2011 | Post et al. |
| 2013/0097135 A1 * | 4/2013 | Goldberg .......... G06F 17/30289 707/704 |

\* cited by examiner

United States Patent
US 9,378,149 B1

METHOD AND SYSTEM FOR TRACKING MODIFICATION TIMES OF DATA IN A STORAGE SYSTEM

BACKGROUND

The speed at which a system can write data to persistent storage and read data from persistent storage is often a critical factor in the overall performance of the system. The traditional approach to reading data from and writing data to persistent storage requires processing by multiple layers in the system kernel and by multiple entities in the hardware. As a result, the traditional approach to reading data from and writing data to persistent storage introduces significant latency in the system and, consequently, reduces the overall performance of the system.

SUMMARY

In general, in one aspect, the invention relates to a method for rebuilding an in-memory data structure. The method includes selecting a first table of contents (TOC) entry of a TOC page of a block in persistent storage, wherein the first TOC entry comprises a first object identifier (ID) of the first object, a first offset ID, and a first birth time, determining, based on the first object ID, that the in-memory data structure comprises a first object metadata for the first object comprising a first mod time and a first object map pointer to a first object map tree, determining, based on the first birth time, that the first birth time in the first TOC entry is greater than the first mod time of the first object, updating, after determining the first object metadata exists and after determining the first birth time is greater than the first mod time, a first stored physical address in the first object map tree based on the first offset ID to a first physical address derived from the first TOC entry, and updating, after determining the first birth time is greater than the first mod time, the first mod time stored in the first object metadata to the first birth time.

In general, in one aspect, the invention relates to a non-transitory computer readable medium comprising instructions, which when executed by a processor perform a method, the method comprising selecting a first table of contents (TOC) entry of a TOC page of a block in persistent storage, wherein the first TOC entry comprises a first object identifier (ID) of the first object, a first offset ID, and a first birth time, determining, based on the first object ID, that the in-memory data structure comprises a first object metadata for the first object comprising a first mod time and a first object map pointer to a first object map tree, determining, based on the first birth time, that the first birth time in the first TOC entry is greater than the first mod time of the first object, updating, after determining the first object metadata exists and after determining the first birth time is greater than the first mod time, a first stored physical address in the first object map tree based on the first offset ID to a first physical address derived from the first TOC entry, and updating, after determining the first birth time is greater than the first mod time, the first mod time stored in the first object metadata to the first birth time.

In general, in one aspect, the invention relates to a storage appliance, comprising: persistent storage, a non-transitory computer readable medium comprising instructions, a processor, configured to execute the instructions, wherein the instructions when executed by the processor perform the method. The method comprising selecting a first table of contents (TOC) entry of a TOC page of a block in persistent storage, wherein the first TOC entry comprises a first object identifier (ID) of the first object, a first offset ID, and a first birth time, determining, based on the first object ID, that the in-memory data structure comprises a first object metadata for the first object comprising a first mod time and a first object map pointer to a first object map tree, determining, based on the first birth time, that the first birth time in the first TOC entry is greater than the first mod time of the first object, updating, after determining the first object metadata exists and after determining the first birth time is greater than the first mod time, a first stored physical address in the first object map tree based on the first offset ID to a first physical address derived from the first TOC entry, and updating, after determining the first birth time is greater than the first mod time, the first mod time stored in the first object metadata to the first birth time.

Other aspects of the invention will be apparent from the following description and the appended claims.

BRIEF DESCRIPTION OF DRAWINGS

FIGS. 4B and 5 show a flowchart for adding a TOC entry to a storage appliance in accordance with one or more embodiments of the invention.

DETAILED DESCRIPTION

Specific embodiments of the invention will now be described in detail with reference to the accompanying figures. In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description In the following description of FIGS. 1-8B, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment which may be implemented in addition to, in conjunction with, or in place of the embodiments described with regard to a corresponding like-named component in any other figure.

In general, embodiments of the invention relate to a method and system for tracking modification times of data in a storage appliance. Specifically, embodiments of the invention relate to creating an in-memory data structure for storing object metadata for each object (e.g., file) in the storage appliance. Each object metadata may include a mod time of the object that describes the time the object was last modified (e.g., updated, cropped, trimmed). Further, embodiments of the invention relate to using the in-memory data structure to directly ascertain the physical address(es) of data for each object in the storage appliance.

Figure 1:
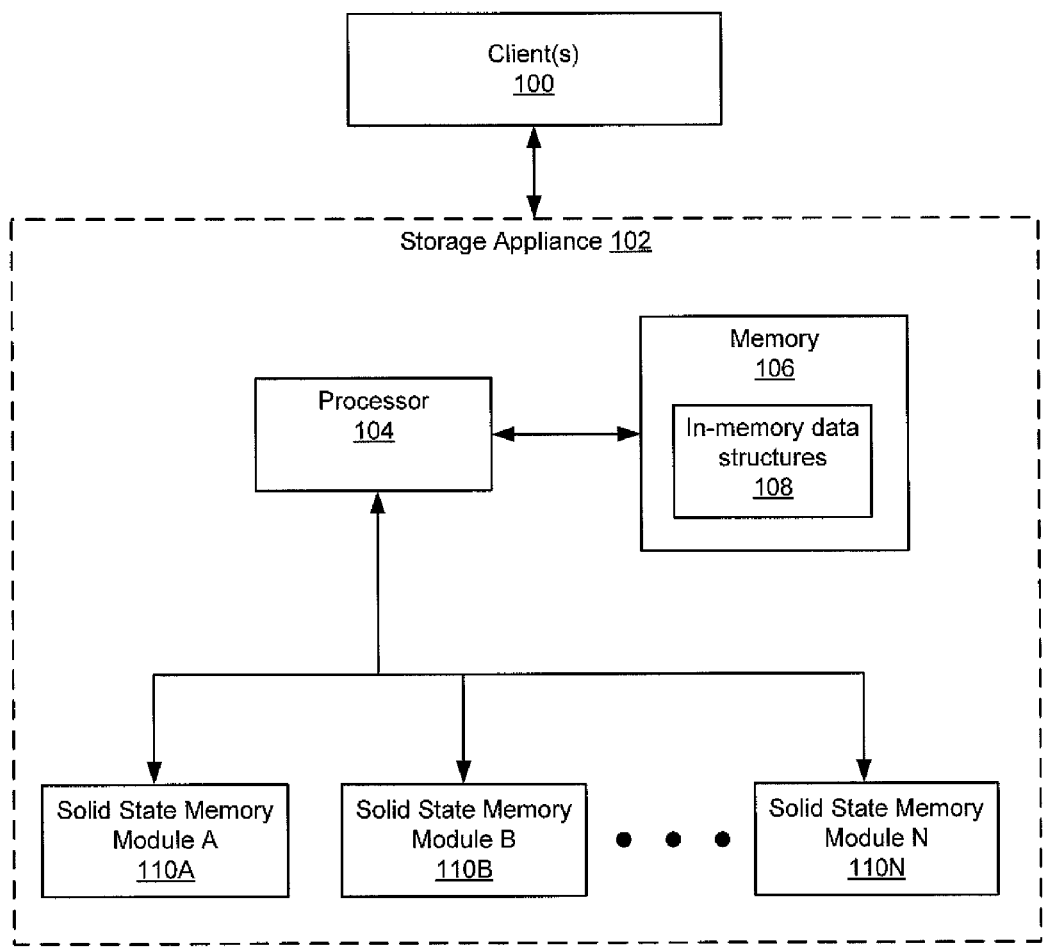
FIG. 1 shows a system in accordance with one or more embodiments of the invention.

FIG. 1 shows a system in accordance with one embodiment of the invention. As shown in FIG. 1, the system includes one or more clients (100) and a storage appliance (102). Each of these components is described below.

In one embodiment of the invention, a client (100) is any system or process executing on a system that includes functionality to issue a read request to the storage appliance (102) and/or issue a write request to the storage appliance. In one embodiment of the invention, the clients (100) may each include a processor (not shown), memory (not shown), and persistent storage (not shown).

In one embodiment of the invention, a client (100) is operatively connected to the storage appliance (102). In one embodiment of the invention, the storage appliance (102) is a system that includes volatile and persistent storage and is configured to service read requests and/or write requests from one or more clients (100). The storage appliance (102) is further configured to create an in-memory data structure during reboot of the system in a manner consistent with the method described below (see e.g., FIGS. 4A and 5). The storage appliance (102) is further configured to add a TOC entry to the storage appliance in a manner consistent with the method described below (see e.g., FIGS. 4B and 5).

In one embodiment of the invention, the storage appliance (102) includes a processor (104), memory (106), and one or more solid state memory modules (e.g., solid state memory module A (110A), solid state memory module B (110B), solid state memory module N (110N)).

In one embodiment of the invention, memory (106) may be any volatile memory including, but not limited to, Dynamic Random-Access Memory (DRAM), Synchronous DRAM, SDR SDRAM, and DDR SDRAM. In one embodiment of the invention, memory (106) is configured to temporarily store various data (including data for table of contents (TOC) entries and frags) prior to such data being stored in a solid state memory module (e.g., 110A, 110B, 110N). Memory (106) is operatively connected to the processor (104).

In one embodiments of the invention, the processor (104) is a group of electronic circuits with a single core or multi-cores that are configured to execute instructions. The processor (104) is configured to execute instructions to implement one or more embodiments of the invention, where the instructions are stored on a non-transitory computer readable medium (not shown) that is located within or that is operatively connected to the storage appliance (102). Alternatively, the storage appliance (102) may be implemented using hardware. The storage appliance (102) may be implemented using any combination of software and/or hardware without departing from the invention.

In one embodiment of the invention, the processor (104) is configured to create and update an in-memory data structure (108), where the in-memory data structure is stored in memory (106). In one embodiment of the invention, the in-memory data structure includes mappings (direct or indirect) between logical addresses and physical addresses. In one embodiment of the invention, the logical address is an address at which the data appears to reside from the perspective of the client (100). In one embodiment of the invention, the logical address is (or includes) a hash value generated by applying a hash function (e.g., SHA-1, MD-5, etc.) to an n-tuple. In one embodiment of the invention, the n-tuple is <object ID, offset ID>, where the object ID defines an object (e.g. file) and the offset ID defines a location relative to the starting address of the object. In another embodiment of the invention, the n-tuple is <object ID, offset ID, birth time>, where the birth time corresponds to the time when the file (identified using the object ID) was created. Alternatively, the logical address may include a logical object ID and a logical byte address, or a logical object ID and a logical address offset. In another embodiment of the invention, the logical address includes an object ID and an offset ID. Those skilled in the art will appreciate that multiple logical addresses may be mapped to a single physical address and that the logical address is not limited to the above embodiments. Further details on the in-memory data structure are discussed below (see FIG. 3A-3B). In one embodiment of the invention, the physical address may correspond to a location in the memory (106) or a location in a solid state memory module (e.g., 110A, 110B, 110N). In one embodiment of the invention, the in-memory data structure may map a single hash value to multiple physical addresses if there are multiple copies of the data in the storage appliance (102).

In one embodiment of the invention, the solid state memory modules (e.g., 110A, 110B, 110N) correspond to any data storage device that uses solid-state memory to store persistent data (i.e., persistent storage). In one embodiment of the invention, solid-state memory may include, but is not limited to, NAND Flash memory, NOR Flash memory, Magnetic RAM Memory (M-RAM), Spin Torque Magnetic RAM Memory (ST-MRAM), Phase Change Memory (PCM), or any other memory defined as a non-volatile Storage Class Memory (SCM).

Those skilled in the art will appreciate that the invention is not limited to the configuration shown in FIG. 1.

Figure 2D:
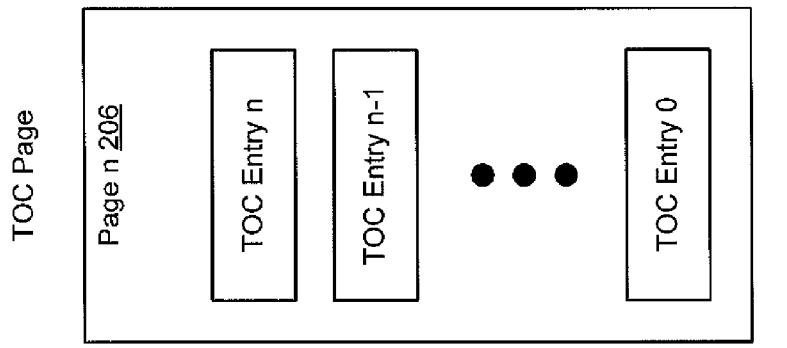
FIG. 2D shows a table of contents (TOC) page in accordance with one or more embodiments of the invention.
Figure 2C:
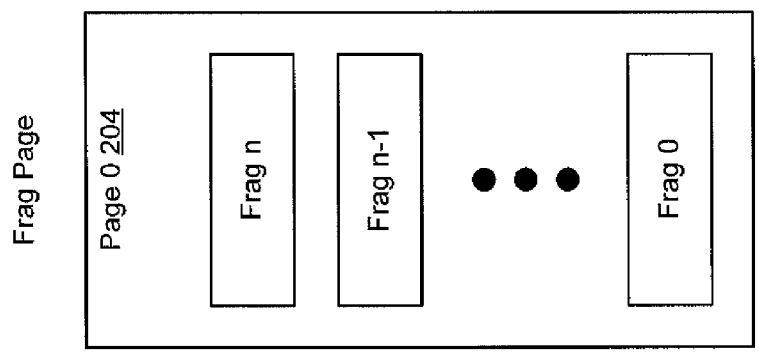
FIG. 2C shows a frag page in accordance with one or more embodiments of the invention.

The following discussion describes embodiments of the invention implemented using solid-state memory modules. Turning to FIG. 2A, FIG. 2A shows a solid-state memory module in accordance with one or more embodiments of the invention. The data storage device (not shown) may include multiple solid-state memory modules. The solid-state memory module (200) includes one or more blocks. In one embodiment of the invention, a block is the smallest erasable unit of storage within the solid-state memory module (200).

Figure 2B:
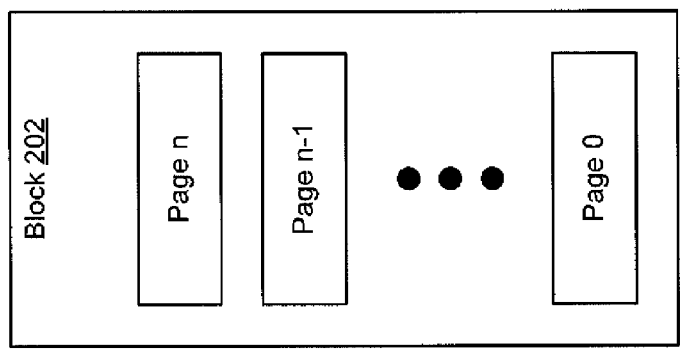
FIG. 2B shows a block in accordance with one or more embodiments of the invention.
Figure 2A:
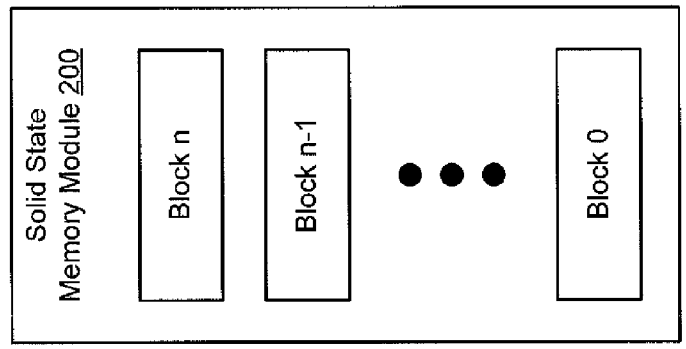
FIG. 2A shows a solid-state memory module in accordance with one or more embodiments of the invention.

FIG. 2B shows a block in accordance with one or more embodiments of the invention. More specifically, each block (202) includes one or more pages. In one embodiment of the invention, a page is the smallest addressable unit for read and program operations (including the initial writing to a page) in the solid-state memory module. In one embodiment of the invention, rewriting a page within a block requires the entire block to be rewritten. In one embodiment of the invention, each page within a block is either a Frag Page (see FIG. 2C) or a TOC Page (see FIG. 2D).

FIG. 2C shows a frag page in accordance with one or more embodiments of the invention. In one embodiment of the invention, the frag page (204) includes one or more frags. In one embodiment of the invention, a frag corresponds to a finite amount of user data (e.g., data provided by the client for storage in the storage appliance). Further, the frags within a given page may be of a uniform size or of a non-uniform size. Further, frags within a given block may be of a uniform size or of a non-uniform size. In one embodiment of the invention, a given frag may be less than the size of a page, may be exactly the size of a page, or may extend over one or more pages. In one embodiment of the invention, a frag page only includes frags. In one embodiment of the invention, each frag includes user data.

FIG. 2D shows a TOC page in accordance with one or more embodiments of the invention. In one embodiment of the invention, the TOC page (206) includes one or more TOC entries, where each of the TOC entries includes metadata for a given frag. In addition, the TOC page (206) may include a reference to another TOC page in the block (202). In one embodiment of the invention, a TOC page only includes TOC entries (and, optionally, a reference to another TOC page in the block), but does not include any frags. In one embodiment of the invention, each TOC entry corresponds to a frag (see FIG. 2C) in the block (202). The TOC entries only correspond to frags within the block. Said another way, the TOC page is associated with a block and only includes TOC entries for frags in that block. In one embodiment of the invention, the last page that is not defective in each block within each of the solid-state memory modules is a TOC page.

Figure 2E:
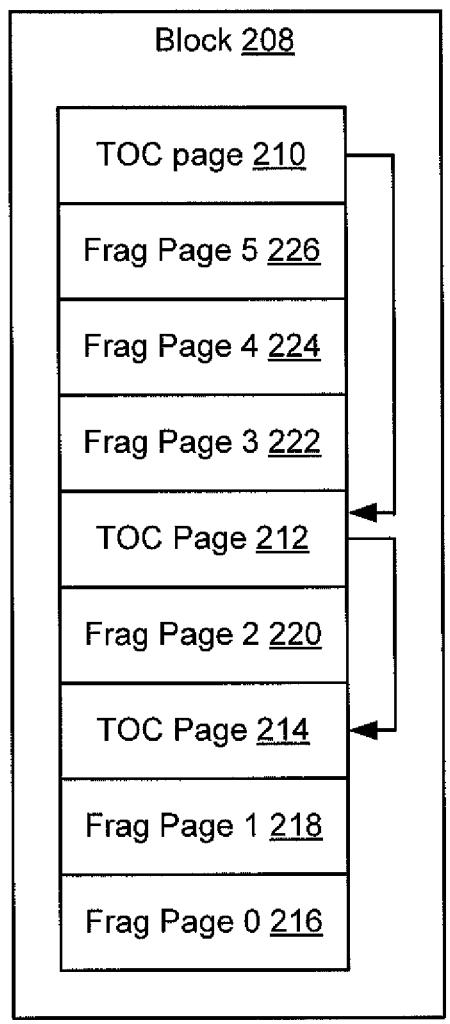
FIG. 2E shows an example of a block in accordance with one or more embodiments of the invention.

FIG. 2E shows an example of a block in accordance with one or more embodiments of the invention. More specifically, FIG. 2E shows a block (208) that includes TOC pages (210, 212, 214) and frag pages (216, 218, 220, 222, 224, 226). In one embodiment of the invention, the block (208) is conceptually filled from "bottom" to "top." Further, TOC pages are generated and stored once the accumulated size of the TOC entries for the frags in the frag pages equal the size of a page. Turning to FIG. 2E, for example, frag page 0 (216) and frag page 1 (218) are stored in the block (208). The corresponding TOC entries (not shown) for the frags (not shown) in frag page 0 (216) and frag page 1 (218) have a total cumulative size equal to the size of a page in the block. Accordingly, a TOC page (214) is generated (using the TOC entries corresponding to frags in the block) and stored in the block (208). Frag page 2 (220) is subsequently written to the block (208). Because the TOC entries corresponding to the frags (not shown) in frag page 2 (220) have a total cumulative size equal to the size of a page in the block, TOC page (212) is created and stored in the block (208). Further, because there is already a TOC page in the block (208), TOC page (212) also includes a reference to TOC page (214).

This process is repeated until there is only one page remaining in the block (208) to fill. At this point, a TOC page (210) is created and stored in the last page of the block (208). Those skilled in the art will appreciate that the total cumulative size of the TOC entries in the TOC page (210) may be less than the size of the page. In such cases, the TOC page may include padding to address the difference between the cumulative size of the TOC entries and the page size. Finally, because there are other TOC pages in the block (208), TOC page (210) includes a reference to one other TOC page (212).

As shown in FIG. 2E, the TOC pages are linked from the "top" of the block to "bottom" of the page, such that the TOC page may be obtained by following a reference from a TOC page that is "above" the TOC page. For example, TOC page (212) may be accessed using the reference in TOC page (210).

Those skilled in the art will appreciate that while block (208) only includes frag pages and TOC pages, block (208) may include pages (e.g., a page that includes parity data) other than frag pages and TOC pages without departing from the invention. Such other pages may be located within the block and, depending on the implementation, interleaved between the TOC pages and the frag pages.

Figure 2F:
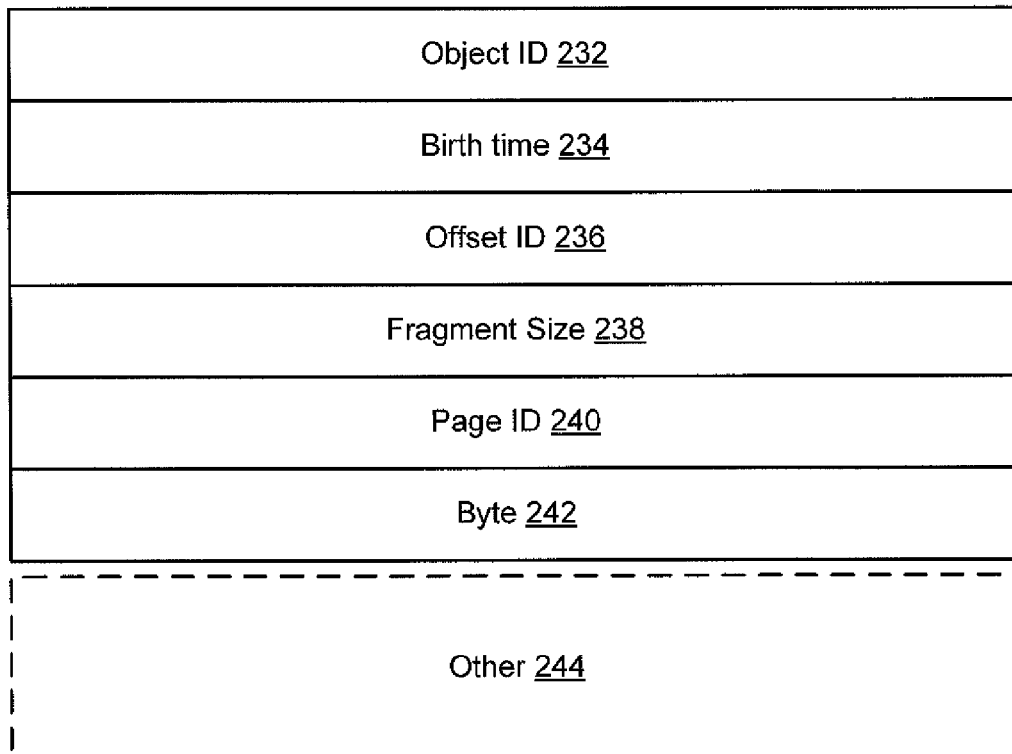
FIG. 2F shows a TOC entry in accordance with one or more embodiments of the invention.

FIG. 2F shows a TOC entry in accordance with one or more embodiments of the invention. In one embodiment of the invention, each TOC entry (230) includes metadata for a frag and may include one or more of the following fields: (i) object ID (232), which identifies the object being stored; (ii) the birth time (234), which specifies the time (e.g., the processor clock value of the processor in the control module) at which the frag corresponding to the TOC entry was written to a solid state memory module; (iii) offset ID (236), which identifies a point in the object relative to the beginning of the object (identified by the object ID); (iv) fragment size (238), which specifies the size of the frag; (v) page ID (240), which identifies the page in the block in which the frag is stored; and (vi) byte (242), which identifies the starting location of the frag in the page (identified by the page ID). The TOC entry (230) may include other fields (denoted by other (244)) without departing from the invention. For example, the TOC entry (230) may include a type field that may specify the time of modification that occurred at the mod time. Examples of modification types include cropping, trimming, and updating (e.g., modifying, adding, etc.).

Those skilled in the art will appreciate that the TOC entry may include additional or fewer fields than shown in FIG. 2F without departing from the invention. Further, the fields in the TOC entry may be arranged in a different order and/or combined without departing from the invention. In addition, while the fields in the TOC entry shown in FIG. 2F appear to all be of the same size, the size of various fields in the TOC entry may be non-uniform, with the size of any given field varying based on the implementation of the TOC entry.

Figure 3A:
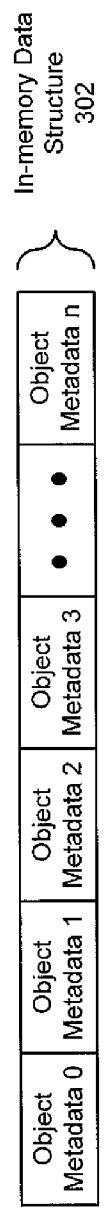
FIG. 3A shows an in-memory data structure in accordance with one or more embodiments of the invention.

FIG. 3A shows an in-memory data structure in accordance with one or more embodiments of the invention. In one embodiment of the invention, the in-memory data structure (302) corresponds to an array or linked list or any data structure that includes object metadata for each object in the storage appliance. For example, element 0 of the data structure includes object metadata for object 0. Element 1 of the data structure includes object metadata for object 1 and so on. In one embodiment of the invention, each object may correspond to a file or any such entity. In one embodiment of the invention, object metadata of an object describes properties of the object (see FIG. 3B).

Figure 3B:
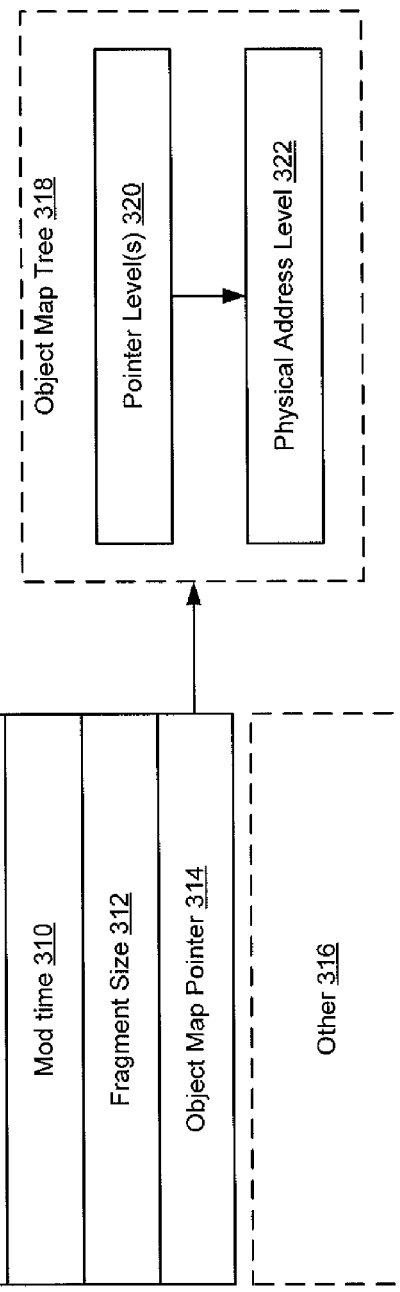
FIG. 3B shows object metadata in accordance with one or more embodiments of the invention.

FIG. 3B shows object metadata in accordance with one or more embodiments of the invention. In one embodiment of the invention, each object metadata (304) includes, specifically, one or more of the following fields for each object: (i) object ID (306), which identifies the object being stored; (ii) size (308), which identifies the size of the object; (iii) the mod time (310), which specifies the time (e.g., the processor clock value of the processor in the control module) at which the object was last modified (e.g., write, update, crop, trim); (iv) fragment size (312), which specifies the size of the frag; and (v) object map pointer (314), which is a reference to an object map tree (318). The object metadata (304) may include other fields (denoted by other (316)) without departing from the invention.

In one embodiment of the invention, the object map tree (318) is a data structure, such as a tree, a hash table, a multi-level table or any data structure that stores the physical addresses of data associated with the object corresponding to the object metadata (304) within the storage appliance (hereinafter "stored physical addresses"). In one embodiment of the invention, the object map tree (318) includes one or more pointer levels (320) and a physical address level (322). The object map tree pointer references the first pointer level. The one or more pointer levels (320) include pointers that reference either the next pointer level or the physical address level (322) if it is the last pointer level. The physical address level (322) includes the stored physical addresses of the most recently modified data associated with the object within the storage appliance. For example, suppose frag 1 is written at time stamp 1 and a frag 2 is written at time stamp 2, where time stamp 2 is greater than or after time stamp 1. Because time stamp 2 occurs after time stamp 1, the physical address level in the object map tree (318) maps to a physical address associated with frag 2. However, frag 1 still exists in the storage appliance until an operation, such as garbage collection, frees the location corresponding to the physical address associated with frag 1. In one embodiment of the invention, the stored physical addresses are organized in the physical address level such that the offset ID and fragment size may be used to determine a location in the physical address level of the stored physical address. The stored physical addresses in the physical address level may be organized in other ways without departing from the invention.

Turning to the flowcharts, while the various steps in the flowchart are presented and described sequentially, one of ordinary skill will appreciate that some or all of the steps may be executed in different orders, may be combined or omitted, and some or all of the steps may be executed in parallel. In one embodiment of the invention, one or more steps shown in FIGS. 4A-6 may be performed in parallel with one or more of the other steps shown in FIGS. 4A-6.

Figure 4A:
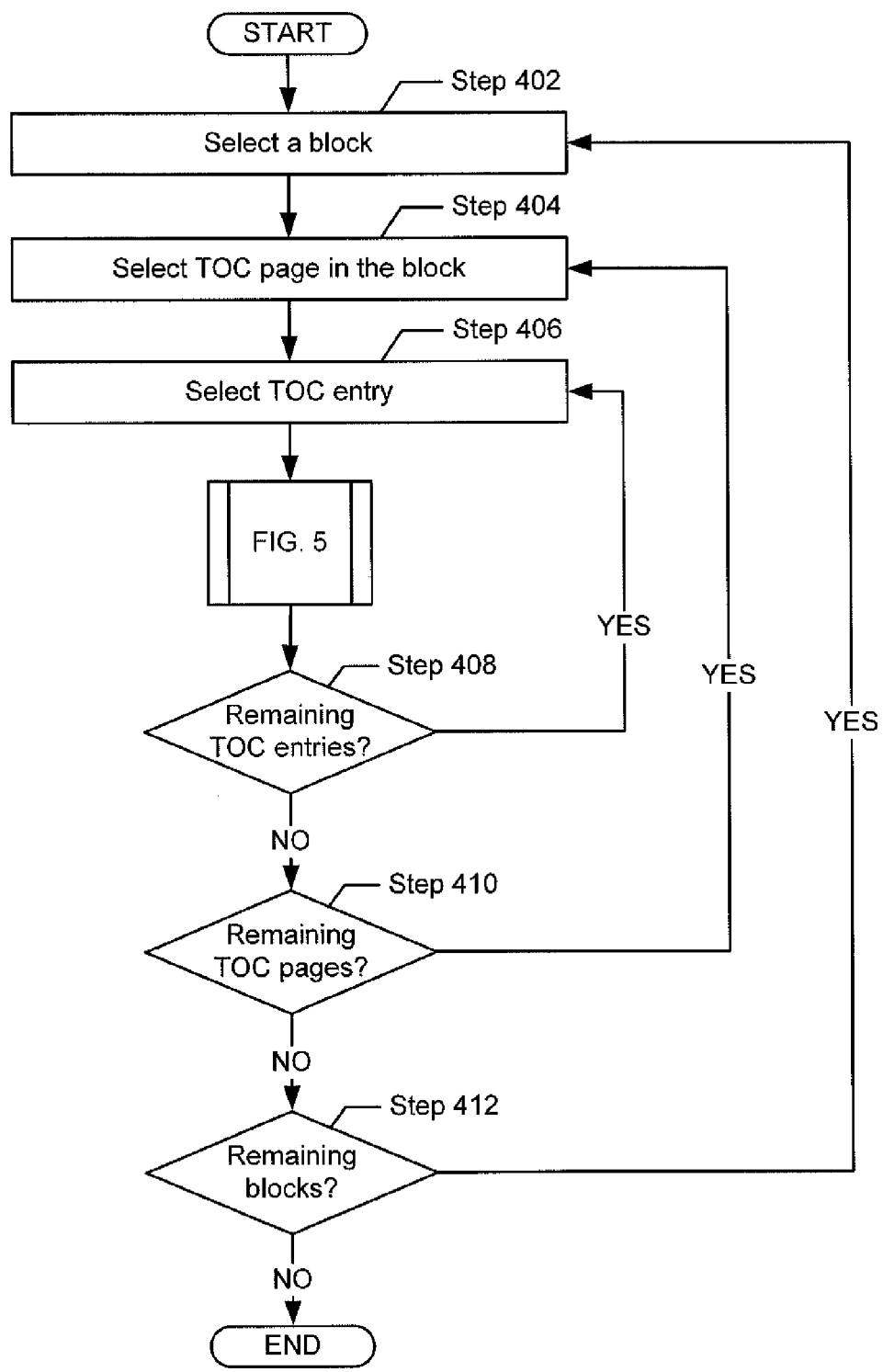
FIGS. 4A and 5 show a flowchart for rebooting a storage appliance in accordance with one or more embodiments of the invention.
Figure 5:
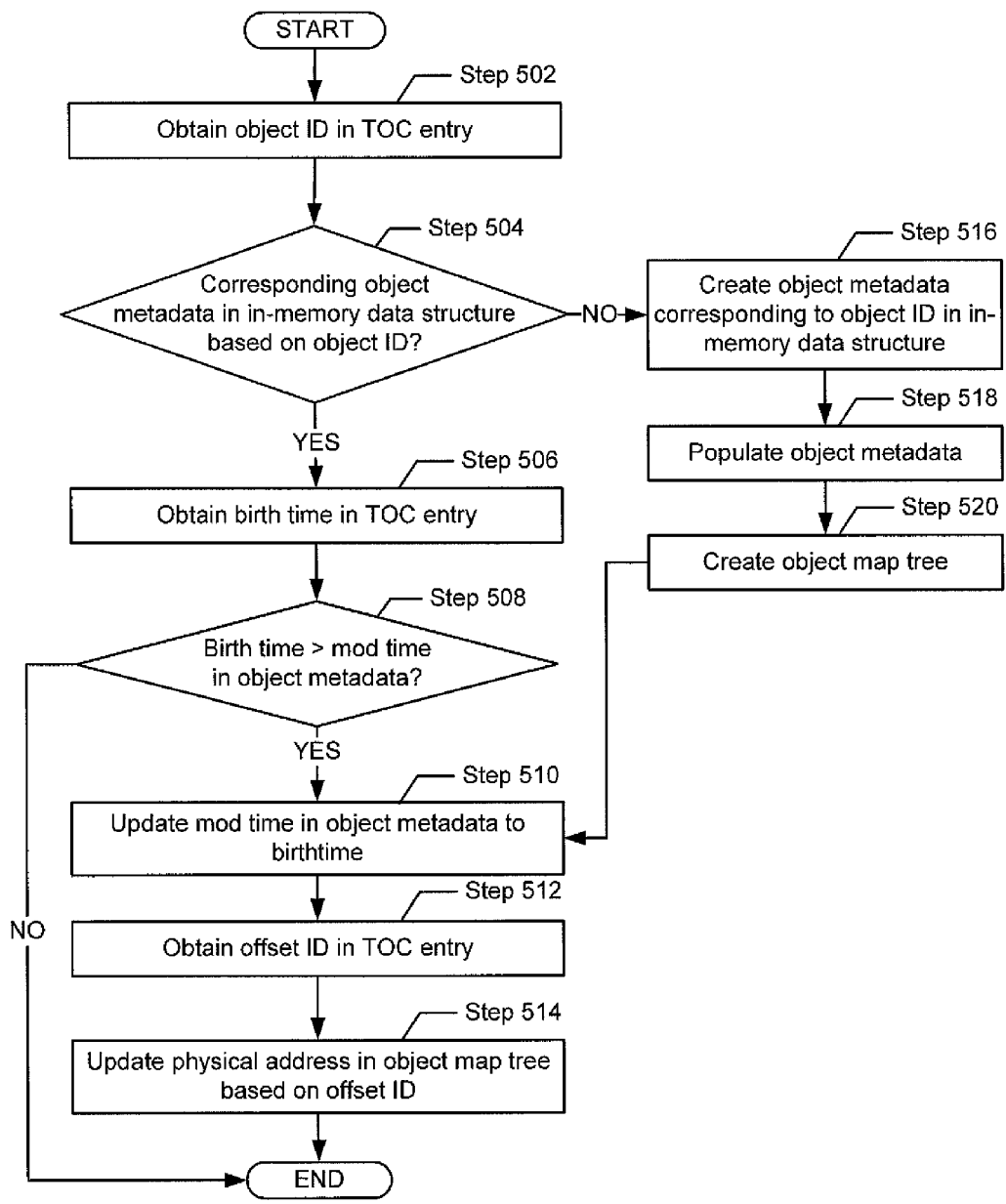

Turning to FIGS. 4A and 5, FIGS. 4A and 5 show a flowchart for rebooting a storage appliance in accordance with one or more embodiments of the invention.

Referring to FIG. 4A, in Step 402, a block is selected. In Step 404, a TOC page in the block is selected. In Step 406, a TOC entry in the TOC page in the block is selected. The process then proceeds to FIG. 5.

Referring to FIG. 5, in Step 502, an object ID is obtained in a TOC entry. In one or more embodiments of the invention, an object ID is an identifier of an object (e.g., file) in the storage appliance.

In Step 504, a determination is made about whether corresponding object metadata for the object exists in an in-memory data structure based on the object ID. In one or more embodiments of the invention, the object ID is a key or index used to lookup or locate the object metadata for the object corresponding to the object ID in the in-memory data structure. The object metadata exists in the in-memory data structure if the object ID maps to the object metadata rather than, for example, a null or empty value. If a determination is made that object metadata for a corresponding object exists in an in-memory data structure based on the object ID, the method may proceed to Step 506. In Step 506, birth time is obtained in the TOC entry. In one or more embodiments of the invention, the birth time is the time when the frag associated with the TOC entry was written to the storage appliance.

In Step 508, a determination is made about whether the birth time is greater than the mod time in the object metadata. In one or more embodiments of the invention, the birth time is greater than the mod time if the birth time occurs after the mod time. If a determination is made that the birth time is greater than the mod time, the method may proceed to Step 510. In Step 510, the mod time in the object metadata is updated to the birth time. Said another way, the mod time in the object metadata is set to the birth time from the TOC entry.

In Step 512, the offset ID is obtained in the TOC entry. In one or more embodiments of the invention, the offset ID is the location or address in the frag page where the frag associated with the TOC entry starts.

In Step 514, the stored physical address in the object map tree is updated based on the offset ID. In one or more embodiments of the invention, each object metadata includes an object map pointer that references the object map tree for the object. The offset ID may be the index or used to derive the index in the physical address level in the object map tree that locates where to store the physical address for the frag associated with the TOC entry. Said another way, the offset ID is used to lookup a physical address of a frag in an object. In one or more embodiments of the invention, a fragment size in the TOC entry may be required to convert the offset ID to an index for the physical address level. For example, suppose a TOC entry specifies a fragment size is 8 kb and an offset ID is 32 kb. An index of 4 is obtained by dividing the offset ID of 32 kb by a fragment size of 8 k. A lookup using an index of 4 in the physical address level may then locate the physical address of the frag associated with the TOC entry.

In one or more embodiments of the invention, the physical address for a frag is defined as the following n-tuple: <storage module, channel, chip enable, LUN, plane, block, page ID, byte>. In one or more embodiments of the invention, the page ID and byte are stored in the TOC entry associated with the frag and may be used to determine the remaining information in the n-tuple to derive a physical address (hereinafter "derived physical address"). Once the derived physical address is obtained, the stored physical address in the physical address level that the offset ID maps to is updated to the derived physical address. In one embodiment of the invention, although the stored physical address is no longer mapped to by the offset ID, the data stored physical address still exists in the storage appliance until an operation frees the physical address (e.g., garbage collection operation). In one or more embodiments of the invention, a stored physical address in the physical address level that the offset ID maps to may not exist and, in such cases, the derived physical address replaces a null or empty value.

Returning to Step 504, if a determination is made that object metadata for a corresponding object does not exist in the in-memory data structure based on the object ID, the method may proceed to Step 516. In Step 516, object metadata for an object corresponding to the object ID is created in the in-memory data structure. In one or more embodiments of the invention, the object metadata is created such that the object ID may be used in the future to locate the object metadata for the object corresponding to the object ID within the in-memory data structure.

In Step 518, the object metadata is populated. In one or more embodiments of the invention, the object metadata is populated with the following information: object ID, size, mod time, fragment size, and object map pointer. In one or more embodiments of the invention, the mod time is set to null. Alternatively, the mod time is automatically set to the birth time in the TOC entry.

In Step 520, the object map tree is created. In one or more embodiments of the invention, the object map tree is created such that the object map pointer in the object references the object map tree. Further, the physical address level referenced by the one or more pointer levels are organized such that the offset ID may be used to locate physical addresses of frags in the object. The method may then proceed to Step 510 discussed above.

The process then proceeds to FIG. 4A, Step 408. In Step 408, a determination is made about whether there are remaining TOC entries in the TOC page. In one or more embodiments of the invention, the TOC page includes one or more TOC entries. If a determination is made that there are remaining TOC entries, the method may return to Step 406 (discussed above). If a determination is made that there are no remaining TOC entries, the method may proceed to Step 410.

In Step 410, a determination is made about whether there are remaining TOC pages in the block. In one or more embodiments of the invention, a block includes one or more TOC pages. If a determination is made that there are remaining TOC pages, the method may return to Step 404 (discussed above). If a determination is made that there are no remaining TOC pages, the method may proceed to Step 412.

In Step 412, a determination is made about whether there are remaining blocks in the solid state module. In one or more embodiments of the invention, the solid state module includes one or more blocks. If a determination is made that there are remaining blocks, the method may return to Step 402.

Figure 4B:
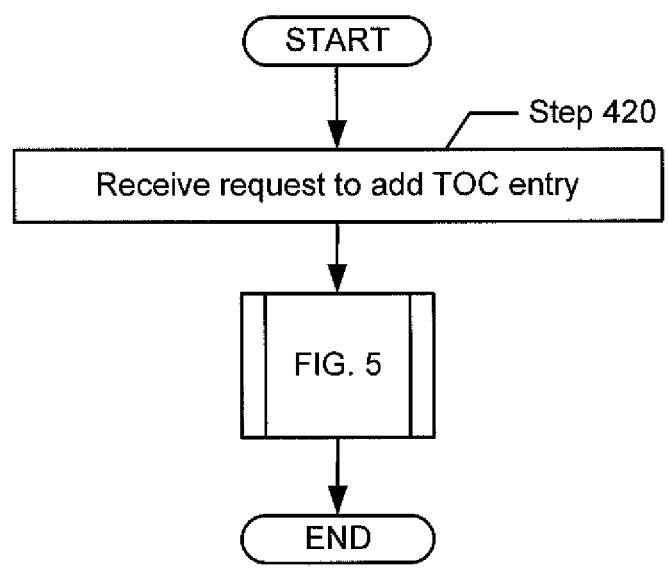

Turning to FIGS. 4B and 5, FIGS. 4B and 5 show a flowchart for adding a TOC entry to a storage appliance in accordance with one or more embodiments of the invention.

Referring to FIG. 4B, a request is received to add a TOC entry to the storage appliance based on receiving a write request to write data to the storage appliance by a client. The write request may include the data to be stored or may include a reference to the data to be stored. The write request may take any form without departing from the invention. In one or more embodiments of the invention, data is stored as (part of) a frag page in a block. A TOC entry is generated and stored for the frag page (typically as part of a TOC page) in the block at the time the frag page is written to the storage appliance. By storing the birth time in the TOC entry, the storage appliance may include functionality to keep track of birth times on a per frag basis. The method then proceeds to FIG. 5 discussed above.

Figure 6:
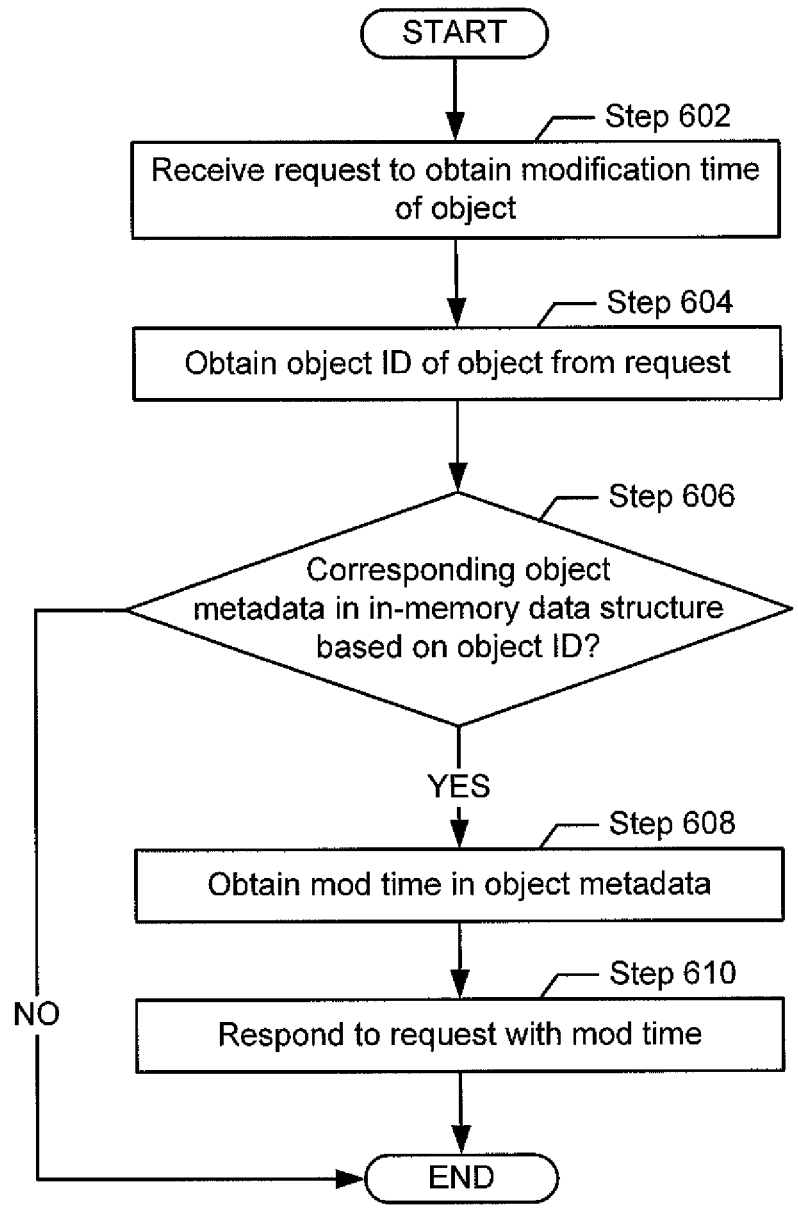
FIG. 6 shows a flowchart for responding to a request for a modification time of an object in accordance with one or more embodiments of the invention.

Turning to FIG. 6, FIG. 6 shows a flowchart for responding to a request for a modification time of an object in accordance with one or more embodiments of the invention.

In Step 602, a request to obtain a modification time of an object is received from a client. In Step 604, an object ID of the object from the request is obtained. In one or more embodiments of the invention, the request from the client includes the following n-tuple: <object ID, offset ID>. The object ID may then be retrieved from the n-tuple. Other methods to derive the object ID, such as a logical address, may be included in the request from the client without departing from the invention.

In Step 606, a determination is made about whether object metadata corresponding to the object exists in an in-memory data structure based on the object ID. In one or more embodiments of the invention, the object ID is a key or index used to lookup or locate the object metadata for the object corresponding to the object ID in the in-memory data structure. The object exists in the in-memory data structure if the object ID maps to the object metadata of the object rather than, for example, null or empty value. If a determination is made that object metadata for the object exists in the in-memory data structure based on the object ID, the method may proceed to Step 608.

In Step 608, a mod time in the object metadata is obtained. In one or more embodiments of the invention, each object metadata includes a mod time describing the last time the object was modified (e.g., written, updated, trimmed, cropped).

In Step 610, the request is responded to with the mod time. Said another way, the storage appliance communicates the mod time to the client that submitted the request.

Figure 7A:
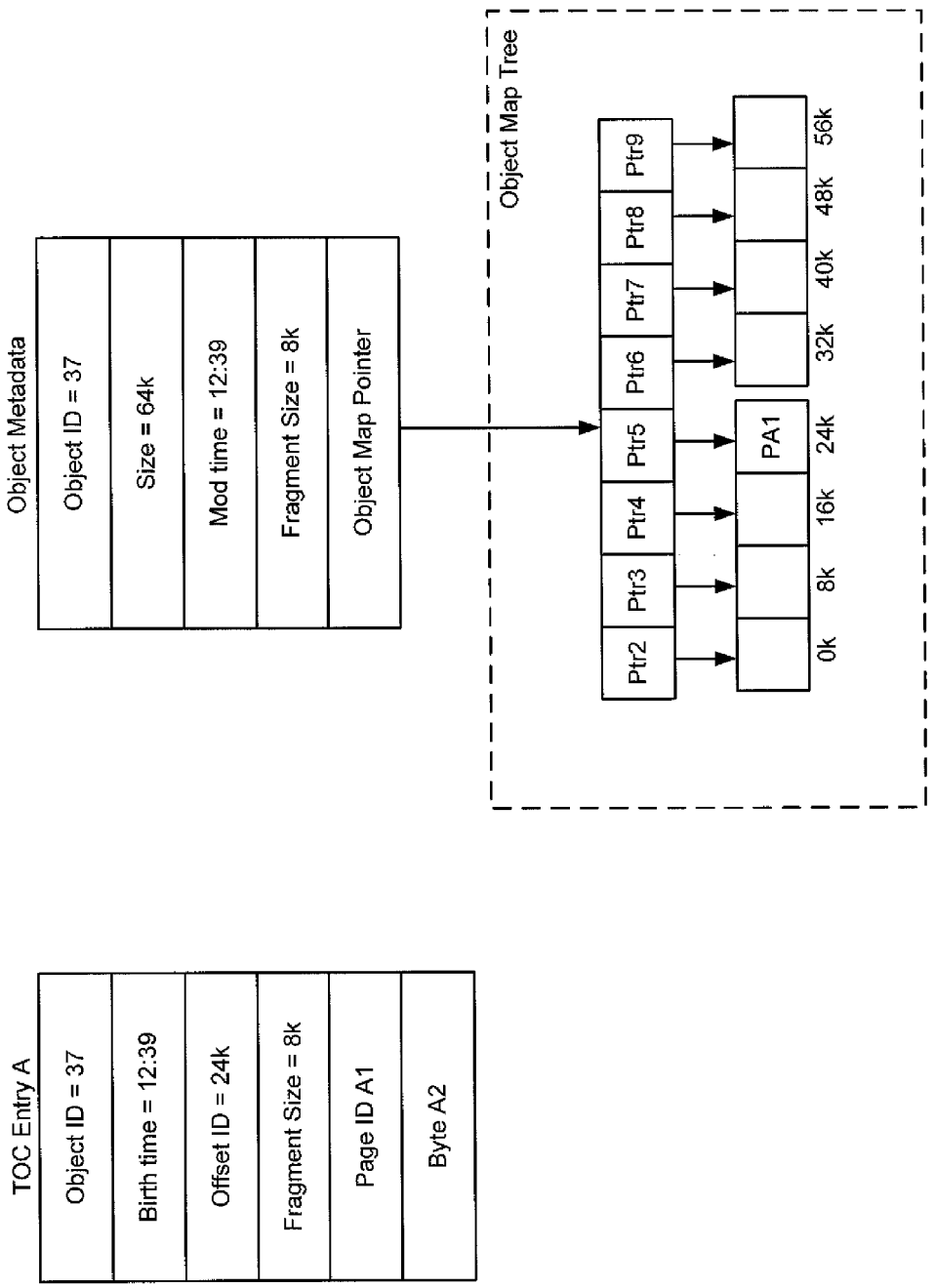
FIGS. 7A and 7B show an example in accordance with one or more embodiments of the invention.
Figure 7B:
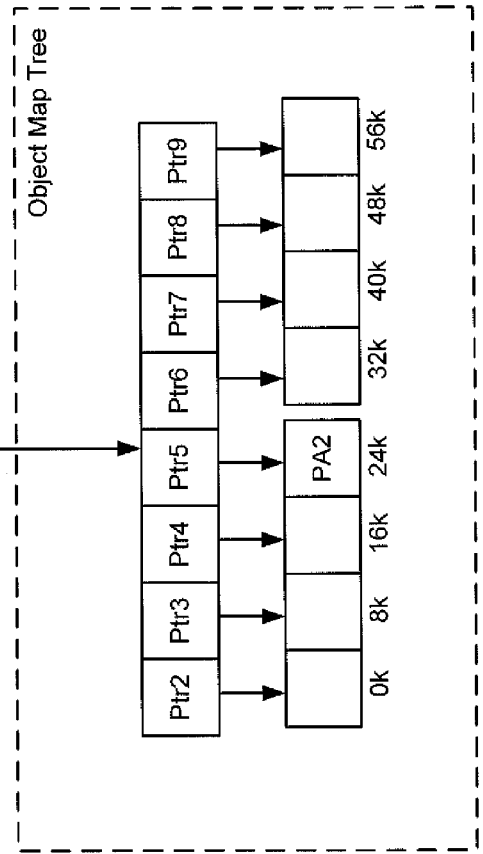

FIGS. 7A and 7B show an example in accordance with one or more embodiments of the invention. The example is not intended to limit the scope of the invention.

Referring to FIG. 7A, consider a scenario in which a write request is received by the storage appliance. TOC entry A is generated. TOC entry A includes an object ID of 37, a birth time of 12:39, an offset ID of 24 k, a fragment size of 8 k, a page ID A1, and a byte A2. Here, the birth time corresponds to the time the frag corresponding to TOC entry A is written to the storage appliance. By storing the birth time in TOC entry A, the storage appliance may include functionality to keep track of birth times on a per frag basis.

The in-memory data structure may be indexed by object ID. A lookup of object ID 37 determines that object metadata for object 37 does not exist in the in-memory data structure. Object 37 is then created in the in-memory data structure and populated with object ID of 37, an object size of 64 k, a mod time of 12:39, a fragment size of 8 k, and an object map pointer from metadata in TOC entry A. The object map pointer references the object map tree. Specifically, the object map tree pointer references a pointer level that may include eight pointers to eight physical addresses associated with object 37 in the storage appliance. There are eight physical addresses because the size of object 37 is 64 k and the fragment size is 8 k. In other words, 64 k divided by 8 k is 8 frags referenced by eight physical addresses.

Continuing with the example in FIG. 7A, pointer 5 references the physical address derived from TOC entry A (i.e., PA1). Pointer 5 references PA1 because the offset ID of 24 k maps to index 3 in the pointer level, where indexing at the pointer level starts at 0. The index in the pointer level is determined by dividing the offset ID by the fragment size (i.e. 24 k/8 k is 3).

Referring to FIG. 7B, consider a scenario in which a second write request is received after updating object 37 based on TOC entry A in FIG. 7A. TOC entry B is generated based on the second write request. TOC entry B includes an object ID of 37, a birth time of 13:14, an offset ID of 24 k, a fragment size of 8 k, a page ID B1, and a byte B2.

As described in FIG. 7A, the in-memory data structure may be indexed by object ID. A lookup of object ID 37 determines that object metadata for object 37 exists in the in-memory data structure. TOC entry B was generated after TOC entry A so the mod time in object 37 is set to the birth time in TOC entry B of 13:14. Because birth times are stored at the time the frags associated with TOC entry A and TOC entry B are written, the mod time is updated based on the maximum of the birth times. Therefore, only one write of the mod time occurs rather than two in this example. Pointer 5 that references the physical address derived from TOC entry A (i.e., PA1) is updated to reference the physical address derived from TOC entry B (i.e., PA2) because the offset ID in TOC entry B is the same as the offset ID in TOC entry A and the mod time is updated to the birth time in TOC entry B.

Continuing with the example, a request to obtain the mod time for object 37 is then received by the storage appliance. The request includes the object ID of 37 and the offset ID of 24 k. Object metadata for object 37 is found to exist in the in-memory data structure based on the object ID as described in FIG. 7A. The mod time of 13:14 is returned to the client that sent the request for the mod time of object 37.

Figure 8A:
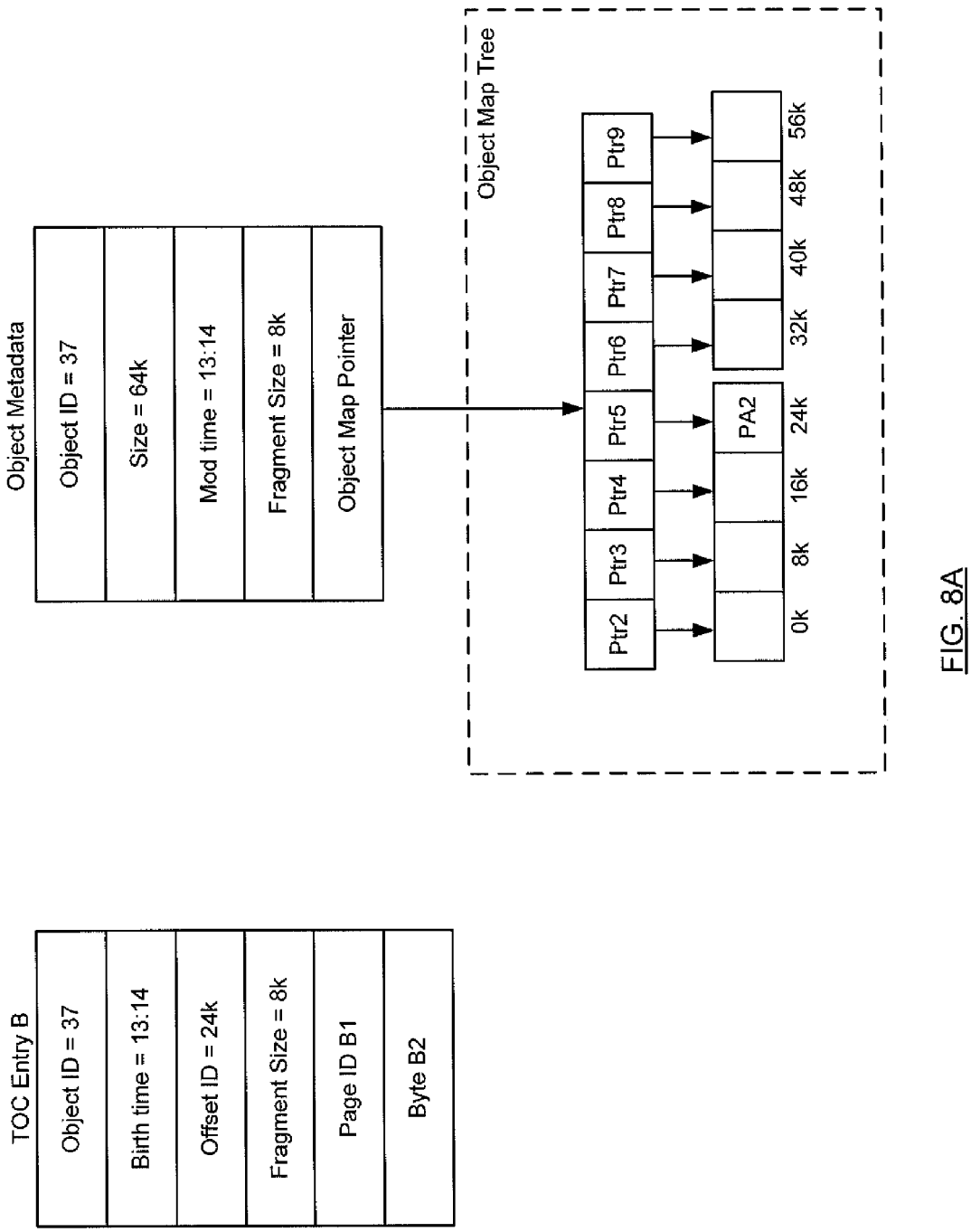
FIGS. 8A and 8B show an example in accordance with one or more embodiments of the invention.
Figure 8B:
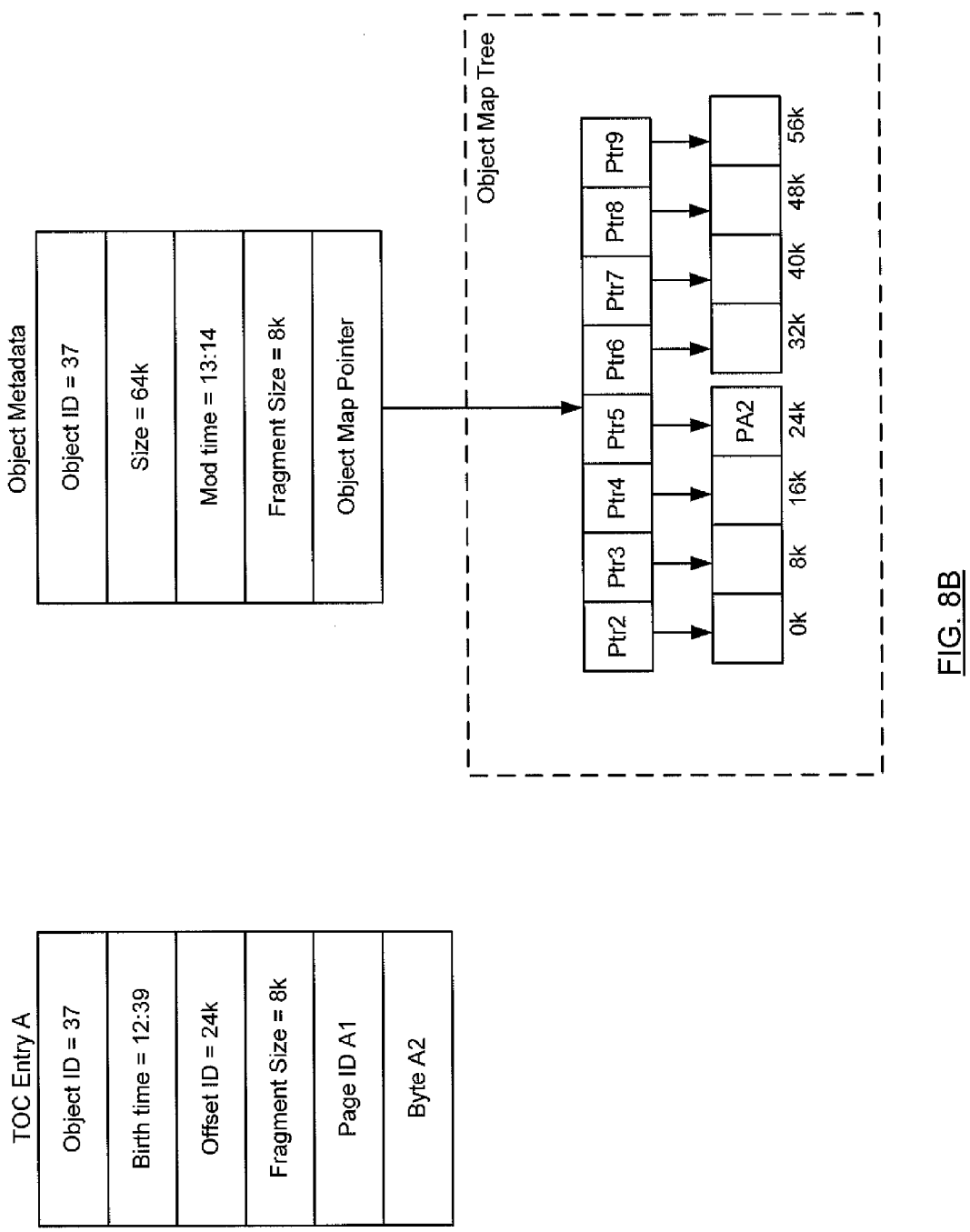

FIGS. 8A and 8B show an example in accordance with one or more embodiments of the invention. The example is not intended to limit the scope of the invention.

Referring to FIG. 8A, consider a scenario in which a storage appliance is rebooted after a shut down. The in-memory data structure is rebuilt by retrieving each TOC entry on each page in each block in the storage appliance. As part of this process, TOC entry B is selected. TOC entry B includes an object ID of 37, a birth time of 13:14, an offset ID of 24 k, a fragment size of 8 k, a page ID B1, and a byte B2.

The in-memory data structure may be indexed by object ID. A lookup of object ID 37 determines that object metadata for object 37 does not exist in the in-memory data structure. Metadata for object 37 is then created in the in-memory data structure and populated with object ID of 37, an object size of 64 k, a mod time of 13:14, a fragment size of 8 k, and an object map pointer from metadata in TOC entry B. The object map pointer references the object map tree. Specifically, the object map tree pointer references a pointer level may include up to eight pointers to eight physical addresses associated with object 37 in the storage appliance. There are eight physical addresses because the size of object 37 is 64 k and the fragment size is 8 k. In other words, 64 k divided by 8 k is eight frags referenced by eight physical addresses.

Continuing with the example in FIG. 8A, pointer 5 references the physical address derived from TOC entry B (i.e., PA2). Pointer 5 references PA2 because the offset ID of 24 k maps to index 3 in the pointer level, where indexing at the pointer level starts at 0. The index in the pointer level is determined by dividing the offset ID by the fragment size (i.e. 24 k/8 k is 3).

Referring to FIG. 8B, consider a scenario in which a second TOC entry, TOC entry A, is selected after updating object 37 based on TOC entry B in FIG. 8A. TOC entry A includes an object ID of 37, a birth time of 12:39, an offset ID of 24 k, a fragment size of 8 k, a page ID A1, and a byte A2.

As described in FIG. 8A, the in-memory data structure may be indexed by object ID. A lookup of object ID 37 determines that object 37 exists in the in-memory data structure. The birth time in TOC entry A of 12:39 is compared to the mod time of 13:14 stored in object 37. Because the birth time is known on a per frag basis, the birth time of TOC entry A and TOC entry B may be compared to determine whether the mod time of object 37 is correct. In this example, the birth time of TOC entry A is not greater than the mod time in object 37. Therefore, the mod time of object 37 is not updated. Accordingly, in this example, an unnecessary write of the mod time is avoided due to storage of birth times for TOC entry A and TOC entry B. Although TOC entry A has the same offset ID of 24 k as TOC entry B, Pointer 5 that references the physical address derived from TOC entry B (i.e., PA2) does not require updating since TOC entry B has a greater birth time.

Continuing with the example, a request to obtain the mod time for object 37 is then received by the storage appliance. The request includes the object ID of 37 and the offset ID of 24 k. Object metadata for object 37 is found to exist in the in-memory data structure based on the object ID as described in FIG. 8A. The mod time of 13:14 is returned to the client that sent the request for the mod time of object 37.

One or more embodiments of the invention enable the creation of an in-memory data structure, which allows the storage appliance to determine the last modification time (i.e. mod time) for each object in the storage appliance. Further, embodiments of the invention enable access to data within an object in a single look-up step. Said another way, the storage appliance may use the in-memory data structure to directly ascertain the physical address(es) of the most recently modified data for each object in the storage appliance. Using this information, the storage appliance is able to directly access the data and does not need to traverse any intermediate metadata hierarchy in order to obtain the data.

Further, by storing a birth time in a TOC entry at the time a frag associated with the TOC entry is written, modification times may be tracked on a per frag basis rather than a per object basis. Additionally, storing the birth time at the time the frag is written allows the storage system to write the modification time for an object once by, for example, taking the maximum of the birth times for any frags associated with the object.

One or more embodiments of the invention may be implemented using instructions executed by one or more processors in the system. Further, such instructions may corresponds to computer readable instructions that are stored on one or more non-transitory computer readable mediums.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for rebuilding an in-memory data structure, comprising:
   selecting a first table of contents (TOC) entry of a TOC page of a block in persistent storage, wherein the first TOC entry comprises a first object identifier (ID) of a first object, a first offset ID, and a first birth time;
   determining, based on the first object ID, that the in-memory data structure comprises a first object metadata for the first object comprising a first mod time and a first object map pointer to a first object map tree;
   determining, based on the first birth time, that the first birth time in the first TOC entry is greater than the first mod time of the first object;
   updating, after determining the first object metadata exists and after determining that the first birth time is greater than the first mod time, a first stored physical address in the first object map tree based on the first offset ID to a first physical address derived from the first TOC entry; and
   updating, after determining that the first birth time is greater than the first mod time, the first mod time stored in the first object metadata to the first birth time.

2. The method of claim 1, further comprising:
   selecting a second TOC entry of the TOC page of the block in the persistent storage, wherein the second TOC entry comprises the first object ID of the first object, the first offset ID, and a second birth time; and
   determining, based on the second birth time, that the second birth time in the second TOC entry is not greater than the first mod time of the first object.

3. The method of claim 1, further comprising:
   selecting a second TOC entry of the TOC page of the block in the persistent storage, wherein the second TOC entry comprises a second object ID of a second object, a second offset ID, and a second birth time;
   determining, based on the second object ID, that the in-memory data structure does not comprise a second object metadata for the second object;
   creating, based on the second object ID, the second object metadata in the in-memory data structure;

populating the second object metadata with the second object ID, a size, a second mod time, a fragment size, and a second object map pointer;

creating a second object map tree referenced by the second object map pointer;

updating, after creating the second object map tree, a second stored physical address in the second object map tree based on the second offset ID to a second physical address derived from the second TOC entry; and updating, after populating the second object, the second mod time to the second birth time.

4. The method of claim 1, wherein the first object metadata comprises the first object map pointer to the first object map tree, a size, the first mod time, the first object ID, a fragment size, and a type field.

5. The method of claim 4, wherein the type field comprises a modification type, wherein the modification type is at least one selected from a group consisting of updating, cropping, and trimming.

6. The method of claim 1, wherein the first TOC entry further comprises at least one selected from a group consisting of a fragment size, a page ID, a byte, and a type field.

7. The method of claim 1, wherein the first object map tree comprises a pointer level comprising a plurality of pointers, and wherein the plurality of pointers reference a plurality of physical addresses comprising the first stored physical address.

8. The method of claim 7, wherein the first stored physical address is located within the first object map tree by determining a pointer of the plurality of pointers that references the first stored physical address based on a function of the first offset ID and a fragment size.

9. The method of claim 1, wherein the in-memory data structure is an array of a plurality of object metadata comprising the first object metadata.

10. The method of claim 1, wherein the block is located in a solid state memory module, and wherein the in-memory data structure is located in memory external to the solid state memory module.

11. The method of claim 1, wherein the persistent storage comprises solid state memory.

12. A non-transitory computer readable medium comprising instructions, which when executed by a processor perform a method, the method comprising:

selecting a first table of contents (TOC) entry of a TOC page of a block in persistent storage, wherein the first TOC entry comprises a first object identifier (ID) of a first object, a first offset ID, and a first birth time;

determining, based on the first object ID, that the in-memory data structure comprises a first object metadata for the first object comprising a first mod time and a first object map pointer to a first object map tree;

determining, based on the first birth time, that the first birth time in the first TOC entry is greater than the first mod time of the first object;

updating, after determining the first object metadata exists and after determining that the first birth time is greater than the first mod time, a first stored physical address in the first object map tree based on the first offset ID to a first physical address derived from the first TOC entry; and updating, after determining that the first birth time is greater than the first mod time, the first mod time stored in the first object metadata to the first birth time.

13. The non-transitory computer readable medium of claim 12, the method further comprising:

selecting a second TOC entry of the TOC page of the block in the persistent storage, wherein the second TOC entry comprises a second object ID of a second object, a second offset ID, and a second birth time;

determining, based on the second object ID, that the in-memory data structure does not comprise a second object metadata for the second object;

creating, based on the second object ID, the second object metadata in the in-memory data structure;

populating the second object metadata with the second object ID, a size, a second mod time, a fragment size, and a second object map pointer;

creating a second object map tree referenced by the second object map pointer;

updating, after creating the second object map tree, a second stored physical address in the second object map tree based on the second offset ID to a second physical address derived from the second TOC entry; and updating, after populating the second object, the second mod time to the second birth time.

14. The non-transitory computer readable medium of claim 12, the method further comprising:

selecting a second TOC entry of the TOC page of the block in the persistent storage, wherein the second TOC entry comprises the first object ID of the first object, the first offset ID, and a second birth time; and determining, based on the second birth time, that the second birth time in the second TOC entry is not greater than the first mod time of the first object.

15. The non-transitory computer readable medium of claim 12, wherein the first object metadata comprises the first object map pointer to the first object map tree, a size, the first mod time, the first object ID, a fragment size, and a type field.

16. The non-transitory computer readable medium of claim 12, wherein the first TOC entry further comprises at least one selected from a group consisting of a fragment size, a page ID, a byte, and a type field.

17. The non-transitory computer readable medium of claim 12, wherein the first object map tree comprises a pointer level comprising a plurality of pointers, and wherein the plurality of pointers reference a plurality of physical addresses comprising the first stored physical address.

18. The non-transitory computer readable medium of claim 17, wherein the first stored physical address is located within the first object map tree by determining a pointer of the plurality of pointers that references the first stored physical address based on a function of the first offset ID and a fragment size.

19. A storage appliance, comprising:

persistent storage;

a non-transitory computer readable medium comprising instructions;

a processor, configured to execute the instructions, wherein the instructions when executed by the processor perform the method, the method comprising:

selecting a first table of contents (TOC) entry of a TOC page of a block in persistent storage, wherein the first TOC entry comprises a first object identifier (ID) of a first object, a first offset ID, and a first birth time;

determining, based on the first object ID, that the in-memory data structure comprises a first object metadata for the first object comprising a first mod time and a first object map pointer to a first object map tree;

determining, based on the first birth time, that the first birth time in the first TOC entry is greater than the first mod time of the first object;

updating, after determining the first object metadata exists and after determining that the first birth time is greater than the first mod time, a first stored physical address in the first object map tree based on the first offset ID to a first physical address derived from the first TOC entry; and updating, after determining that the first birth time is greater than the first mod time, the first mod time stored in the first object metadata to the first birth time.

20. The system of claim 19, wherein the first object map tree comprises a pointer level comprising a plurality of pointers, wherein the plurality of pointers reference a plurality of physical addresses comprising the first stored physical address, and wherein the first stored physical address is located within the first object map tree by determining a pointer of the plurality of pointers that references the first stored physical address based on a function of the first offset ID and a fragment size.

\* \* \* \* \*